US011724337B2

(12) United States Patent
Owaki et al.

(10) Patent No.: US 11,724,337 B2
(45) Date of Patent: Aug. 15, 2023

(54) HYBRID WELDING DEVICE

(71) Applicants: IHI INSPECTION & INSTRUMENTATION CO., LTD., Tokyo (JP); TADANO LTD., Kagawa (JP)

(72) Inventors: Katsura Owaki, Kanagawa (JP); Isao Kawaguchi, Kanagawa (JP); Satomi Maki, Kanagawa (JP); Hiroki Matsuo, Kagawa (JP); Takahiro Akizuki, Kagawa (JP); Naoya Sawada, Kagawa (JP)

(73) Assignees: IHI INSPECTION & INSTRUMENTATION CO., LTD., Tokyo (JP); TADANO LTD., Kagawa (JP)

( * ) Notice: Subject to any disclaimer, the term of this patent is extended or adjusted under 35 U.S.C. 154(b) by 437 days.

(21) Appl. No.: 17/056,383

(22) PCT Filed: May 15, 2019

(86) PCT No.: PCT/JP2019/019338
§ 371 (c)(1),
(2) Date: Nov. 17, 2020

(87) PCT Pub. No.: WO2019/221181
PCT Pub. Date: Nov. 21, 2019

(65) Prior Publication Data
US 2021/0252636 A1 Aug. 19, 2021

(30) Foreign Application Priority Data
May 18, 2018 (JP) ................................. 2018-096124

(51) Int. Cl.
B23K 26/142 (2014.01)
B23K 26/348 (2014.01)
(Continued)

(52) U.S. Cl.
CPC ........ *B23K 26/142* (2015.10); *B23K 26/1462* (2015.10); *B23K 26/348* (2015.10)

(58) Field of Classification Search
CPC . B23K 26/142; B23K 26/1462; B23K 26/348
See application file for complete search history.

(56) References Cited

U.S. PATENT DOCUMENTS

2003/0136768 A1  7/2003  Sonoda et al.

FOREIGN PATENT DOCUMENTS

CN    101920400 A     12/2010
DE    102005025119 A1 * 12/2005 ............. B23K 26/14
(Continued)

OTHER PUBLICATIONS

JPO; Application No. 201980031806.8; Office Action dated Aug. 20, 2021.

*Primary Examiner* — Geoffrey S Evans
(74) *Attorney, Agent, or Firm* — Fitch, Even, Tabin & Flannery LLP

(57) ABSTRACT

A hybrid welding device capable of reducing an influence of by-products such as spatters, plasma, plumes, and fume, and reducing contamination of a laser optical system and welding defects is provided. A laser head includes a laser nozzle that forms an optical path of a laser beam, a first rectifying plate that is arranged on a tip side of the laser nozzle so as not to interfere with the laser beam, a first air knife that injects compressed air along the first rectifying plate, a second rectifying plate that is arranged between the first rectifying plate and the welded portion so as not to interfere with the laser beam, and a second air knife that injects compressed air along the second rectifying plate. The first rectifying plate and the second rectifying plate have a shape elongated in a direction perpendicular to an optical axis of the laser beam and a welding direction. The second recti- (Continued)

fying plate has a torch opening through which a tip of a welding torch can be inserted.

10 Claims, 5 Drawing Sheets

(51) Int. Cl.
*B23K 26/146* (2014.01)
*B23K 26/14* (2014.01)

(56) References Cited

FOREIGN PATENT DOCUMENTS

| | | |
|---|---|---|
| JP | 2000-263276 A | 9/2000 |
| JP | 2003-200283 A | 7/2003 |
| JP | 2005-219108 A | 8/2005 |
| JP | 2015-217423 A | 12/2015 |
| WO | 2014030325 A1 | 2/2014 |

* cited by examiner

HYBRID WELDING DEVICE

CROSS-REFERENCE TO RELATED APPLICATIONS

This application is a U.S. national phase application filed under 35 U.S.C. § 371 of International Application PCT/JP2019/019338, filed May 15, 2019, which is based upon and claims the benefit of priority from the prior Japanese Application No. 2018-096124, filed May 18, 2018.

TECHNICAL FIELD OF THE INVENTION

The present invention relates to hybrid welding devices, and in particular, relates to a hybrid welding device that combines laser welding and arc welding.

BACKGROUND ART OF THE INVENTION

Since hybrid welding that integrates laser welding with arc welding (so-called laser-arc hybrid welding) combines advantages of both of the arc welding and laser welding such as being able to deepen a penetration depth, being able to achieve a speedup, and being able to suppress welding deformation due to low heat input, the hybrid welding is suitable for welding large structures.

For example, in Patent Literature 1, in the space located between the opening from which the laser beam is emitted on the laser welding head and the workpiece to be welded, the protective tube that is substantially parallel to the workpiece to be welded is arranged so as not to interfere with the laser beam. In addition to forming the first air shutter inside the protective tube, the technology that forms the second air shutter by the flow of air that intersects with the first air shutter and is directed obliquely downward from the upper side of the protective tube toward the welding proceeding direction is disclosed in Patent Literature 1. In the invention disclosed in Patent Literature 1, the directions to which the spatters are scattered are deflected by the synergistic effect between the first air shutter and the second air shutter.

CITATION LIST

Patent Literature

Patent Literature 1: JP 2005-219108 A

SUMMARY OF INVENTION

By the way, in general, if by-products such as spatters (fine particles of scattered molten metal), plasma, plumes (flow of plasma), and fumes (vaporized molten metal) are generated during welding, it is known that various problems are prone to occur. For example, if the spatters, plumes, fumes, and the like reach a surface of a laser optical system (condenser lens, protective glass, and the like), the spatters, plumes, fumes, and the like, after being cooled on the surface, solidify on the surface or adhere to the surface and the surface of the laser optical system gets contaminated.

Also, when the plasma and plumes occur during welding, a laser beam is absorbed, refracted, scattered, or the like by the generated plasma and plumes, and energy density of the laser beam decreases resulting in shallowing the penetration depth. In addition, by fluctuation of states of the plasma and plumes, the energy density of the laser beam fluctuates, and welding defects are prone to occur.

In the invention described in Patent Literature 1, the first air shutter is formed by injecting the compressed air into the protective tube, and the second air shutter is formed by injecting the compressed air obliquely downward into the protective tube from the upper side of the protective tube. However, since the compressed air of the second air shutter collides with the compressed air of the first air shutter, the flow of the compressed air by the first air shutter is limited, resulting in deteriorating the function as the air shutter.

In addition, in the invention described in Patent Literature 1, the surrounding air is actively taken into the protective tube from the air intake port formed on the side surface of the protective tube. However, there is a problem that such airflow generates airflow in the vicinity of the welded portion, which causes the states of the plasma and plumes to fluctuate largely and a state of a molten pool to be destabilized.

The present invention is devised because of the problems described above, and an object of the present invention is to provide a hybrid welding device that can reduce the influences of the by-products such as the spatters, plasma, plumes, and fumes, reduce the contamination of the laser optical system, and reduce the welding defects.

According to the present invention, in a hybrid welding device that performs welding by combining use of laser welding and arc welding, a laser head that emits a laser beam to a welded portion and a welding torch that supplies a filler material to the welded portion are included. The laser head includes a laser nozzle that forms an optical path of the laser beam, a first rectifying plate that is arranged on a tip side of the laser nozzle so as not to interfere with the laser beam, a first air knife that injects compressed air along the first rectifying plate, a second rectifying plate that is arranged between the first rectifying plate and the welded portion so as not to interfere with the laser beam, and a second air knife that injects compressed air along the second rectifying plate. The first rectifying plate and the second rectifying plate have a shape elongated in a direction perpendicular to an optical axis of the laser beam and a welding direction. The second rectifying plate has a torch opening through which a tip of the welding torch can be inserted.

The first air knife may be arranged to inject the compressed air in the longitudinal direction of the first rectifying plate, and the second air knife may be arranged to inject the compressed air in the longitudinal direction of the second rectifying plate.

The first rectifying plate may include a first flat surface member arranged on the laser nozzle side, a second flat surface member arranged on the welded portion side to face the first flat surface member, and a connecting member that connects a side surface of the first flat surface member on one side in the longitudinal direction and a side surface of the second flat surface member on one side in the longitudinal direction. The first flat surface member and the second flat surface member may have a laser opening through which the laser beam passes.

The second rectifying plate may include a front surface member arranged above the welded portion, and a pair of side surface members arranged along side surfaces on both sides of the front surface member in the longitudinal direction. The front surface member may have a laser opening through which the laser beam passes and the torch opening.

The hybrid welding device may include a bracket that connects the first rectifying plate and the second rectifying plate.

The hybrid welding device may include a tip nozzle that is arranged between the first rectifying plate and the second rectifying plate and forms an optical path of the laser beam.

The hybrid welding device may include an insulating material that fills a gap between the torch opening and the welding torch.

The hybrid welding device may include a gate valve arranged in the laser nozzle.

The second rectifying plate may be formed to be longer than the first rectifying plate.

The flow rate of the compressed air injected from the first air knife may be set to be larger than the flow rate of the compressed air injected from the second air knife.

According to the above-described hybrid welding device according to the present invention, between the welded portion and the laser head, two layers of rectifying plates (the first rectifying plate and the second rectifying plate) are arranged. Since the compressed air is made to flow along each of these rectifying plates, the by-products such as the spatters, plumes, and fumes that enter the laser optical system can be eliminated.

In addition, since the welding torch penetrates through the second rectifying plate and an outer periphery of the welding torch is covered with the second rectifying plate, an influence that a turbulent flow generated when the compressed air from the second air knife collides with the welding torch makes on air in the vicinity of the welded portion can be reduced. Therefore, since the turbulence of the air in the vicinity of the welded portion can be suppressed, the states of the plasma and plumes are not significantly fluctuated and the state of the molten pool is not destabilized.

As a result, according to the hybrid welding device of the present invention, it is possible to reduce the influence of the by-products such as the spatters, plasma, plumes, and fumes, and reduce the contamination of the laser optical system and the welding defects.

DETAILED DESCRIPTION OF THE PREFERRED EMBODIMENTS

Figure 1:
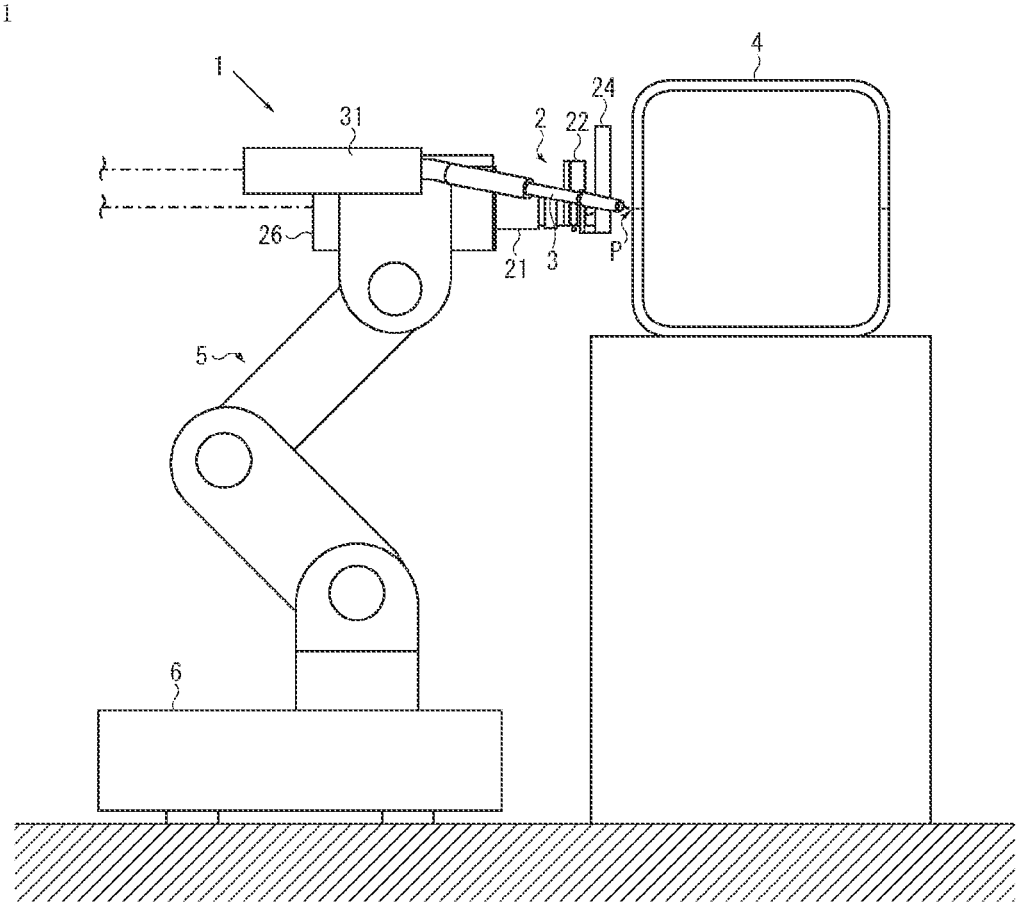
FIG. 1 is a side view illustrating an overall configuration of a hybrid welding device according to an embodiment of the present invention.
Figure 2:
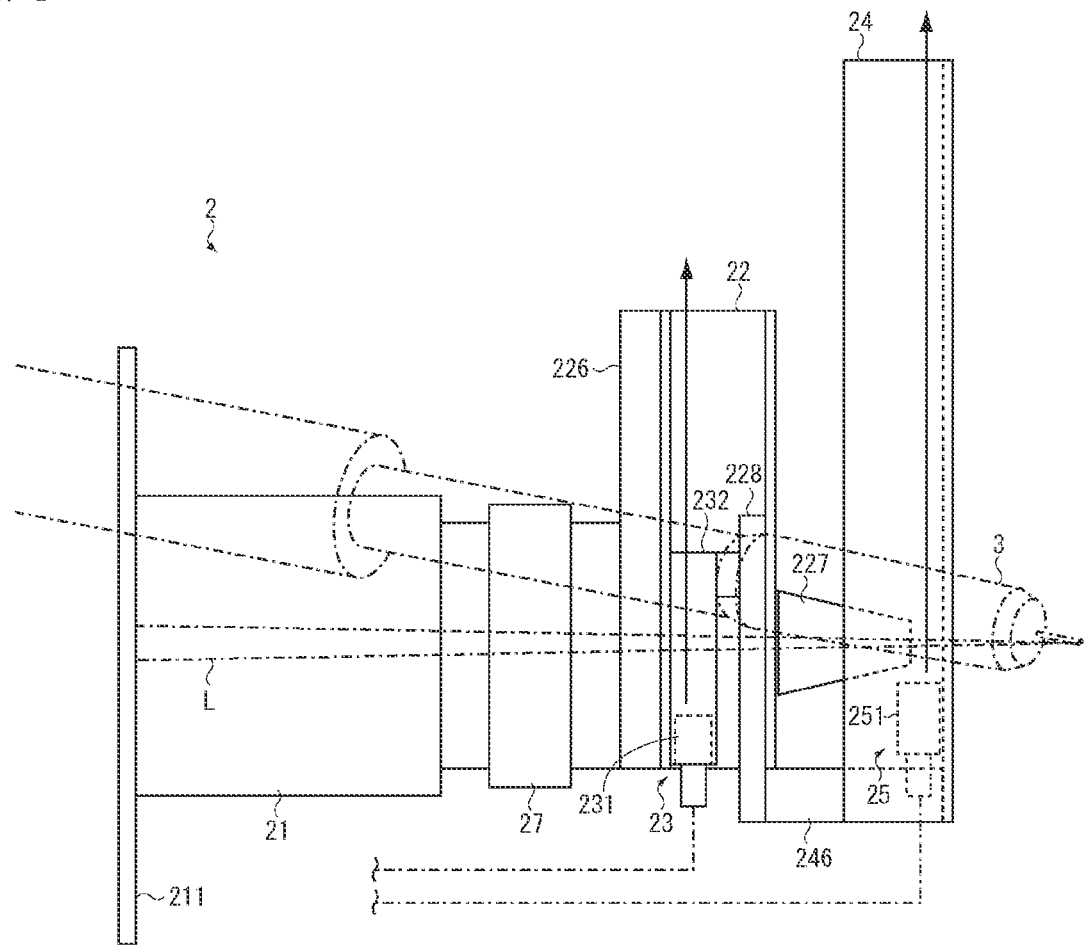
FIG. 2 is a side view illustrating a laser head in FIG. 1.
Figure 2:
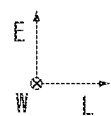
Figure 3:
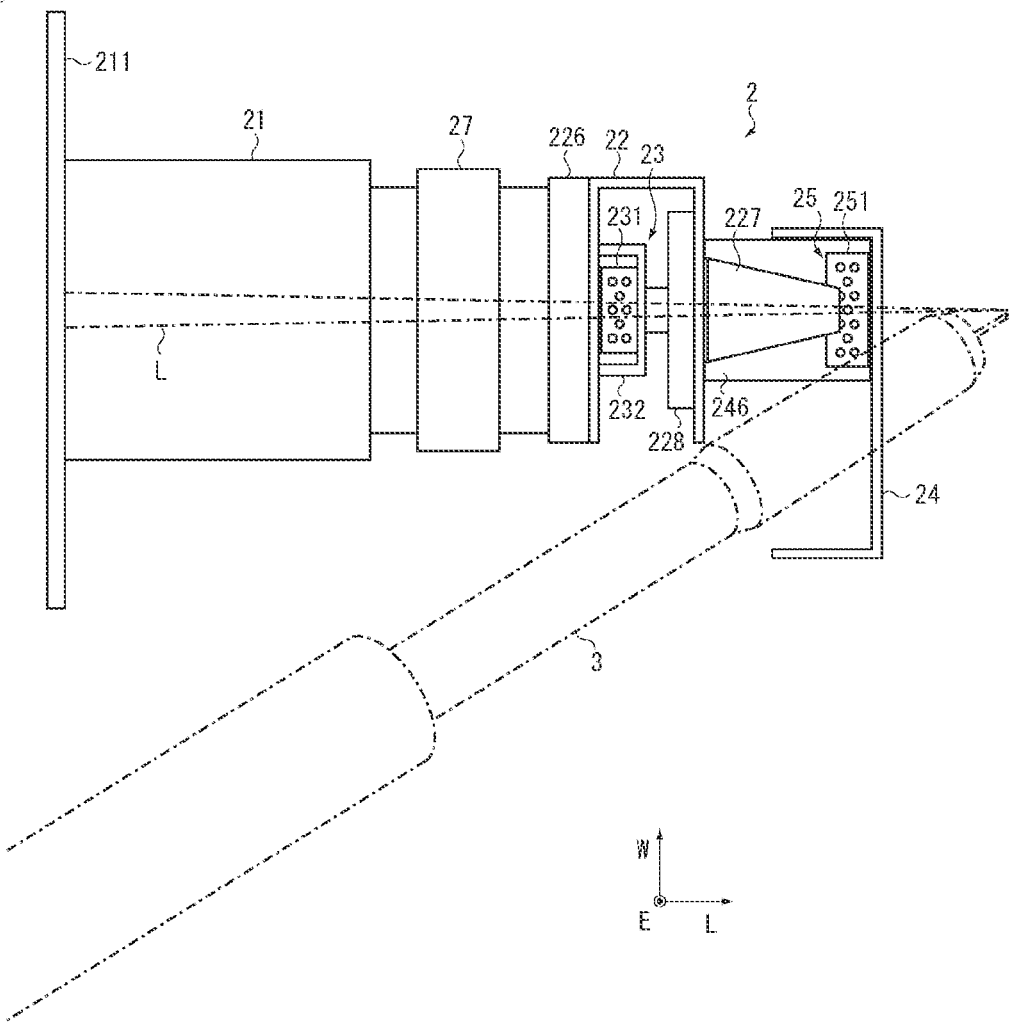
FIG. 3 is a top view illustrating the laser head in FIG. 1.

Embodiments of the present invention will be described below with reference to FIGS. 1 to 5(B). Here, FIG. 1 is a side view illustrating an overall configuration of a hybrid welding device according to an embodiment of the present invention. FIG. 2 is a side view illustrating a laser head in FIG. 1. FIG. 3 is a top view illustrating the laser head in FIG. 1. Note that, in FIGS. 2 and 3, a welding torch is virtually illustrated by chain lines in order to clarify the positional relationship.

For example, as illustrated in FIGS. 1 to 3, a hybrid welding device 1 according to an embodiment of the present invention is a hybrid welding device that performs welding by combining use of laser welding and arc welding and includes a laser head 2 that emits a laser beam L to a welded portion P and a welding torch 3 that supplies a filler material to the welded portion P. The laser head 2 includes a laser nozzle 21 that forms an optical path of the laser beam L, a first rectifying plate 22 that is arranged on a tip side of the laser nozzle 21 so as not to interfere with the laser beam L, a first air knife 23 that injects compressed air along the first rectifying plate 22, a second rectifying plate 24 that is arranged between the first rectifying plate 22 and the welded portion P so as not to interfere with the laser beam L, and a second air knife 25 that injects compressed air along the second rectifying plate 24. The first rectifying plate 22 and the second rectifying plate 24 have a shape elongated in a direction E perpendicular to an optical axis of the laser beam L and a welding direction W, and the second rectifying plate 24 has a torch opening 244 through which a tip of the welding torch 3 can be inserted.

A workpiece to be welded 4 illustrated in FIG. 1 is, for example, a long steel structure having a hollow tubular shape. The workpiece to be welded 4 is specifically a boom which is a component of a crane vehicle, a tower wagon, a bridge inspection vehicle, and the like. In recent years, the boom described above has been formed into a long tubular shape by butt-welding both end portions on an open side of a steel material having a substantially U-shaped cross section. Note that the workpiece to be welded 4 is not limited to the boom and the tubular structure.

FIG. 1 illustrates a case where steel materials are arranged vertically and a butt portion formed on a side surface portion is laterally welded. Note that the hybrid welding device 1 according to the present embodiment may also be used in a case where the steel materials are arranged horizontally and the butt portion formed on an upper surface portion is welded downward.

As illustrated in FIG. 1, for example, the laser head 2 and the welding torch 3 are arranged at a tip of a robot arm 5. The robot arm 5 is mounted on, for example, a carriage 6 that is movable in the welding direction W on a floor surface. By controlling the robot arm 5, attitudes of the laser head 2 and the welding torch 3 are controlled, and the workpiece to be welded 4 is welded while the carriage 6 is moved.

Note that the configuration that supports the laser head 2 and the welding torch 3 is not limited to the illustrated configuration. For example, the laser head 2 and the welding torch 3 may be arranged on a rail arranged along the welding direction so that the attitudes of the laser head 2 and the welding torch 3 may be controlled.

The welding torch 3 is, for example, a torch for the arc welding. The welding torch 3 is fixed to the tip of the robot arm 5 or to the laser head 2 by a supporting component 31. Also, although not illustrated in the drawings, the welding torch 3 is configured in a way that a filler material (a welding wire) is supplied by a welding wire feeder. In addition, the welding torch 3 is arranged at an angle inclined with respect to the optical axis of the laser beam L.

Furthermore, the hybrid welding device 1 according to the present embodiment is configured so that the laser welding is performed primarily and the arc welding is performed subsequently, but the configuration of the hybrid welding device 1 is not limited to the configuration described above. For example, the hybrid welding device 1 may be configured so that the arc welding is performed primarily and the laser welding is performed subsequently.

As illustrated in FIG. 1, the laser head 2 may include a condenser lens unit 26 connected to the laser nozzle 21. The condenser lens unit 26 includes a plurality of lenses and has a function of adjusting a diameter and focus of the emitted laser beam. The condenser lens unit 26 is connected to a laser oscillator (not illustrated in the drawings) via an optical fiber.

In the laser head 2 illustrated in FIGS. 2 and 3, the illustration of the condenser lens unit 26 is omitted for convenience of description. As illustrated in FIGS. 2 and 3, the laser nozzle 21 has a substantially cylindrical shape. In addition, the laser nozzle 21 includes a flange 211 that connects the laser nozzle 21 to the condenser lens unit 26 on a rear end side. Furthermore, a gate valve 27 capable of blocking the optical path of the laser beam L may be arranged on the tip side of the laser nozzle 21. Note that the gate valve 27 may be arranged on the rear end side or the intermediate portion of the laser nozzle 21.

The gate valve 27 is controlled so as to open the optical path when the laser beam L is emitted and close the optical path immediately after stopping emitting the laser beam L. By arranging the gate valve 27 described above in the optical path of the laser beam L, it is possible to eliminate the by-products such as the plumes and fumes that are sucked into the laser nozzle 21 and adhere to a surface of the condenser lens unit 26 after stopping emitting the laser beam L. Note that, in FIGS. 2 and 3, a driving unit for the gate valve 27 is not illustrated.

Figure 4:
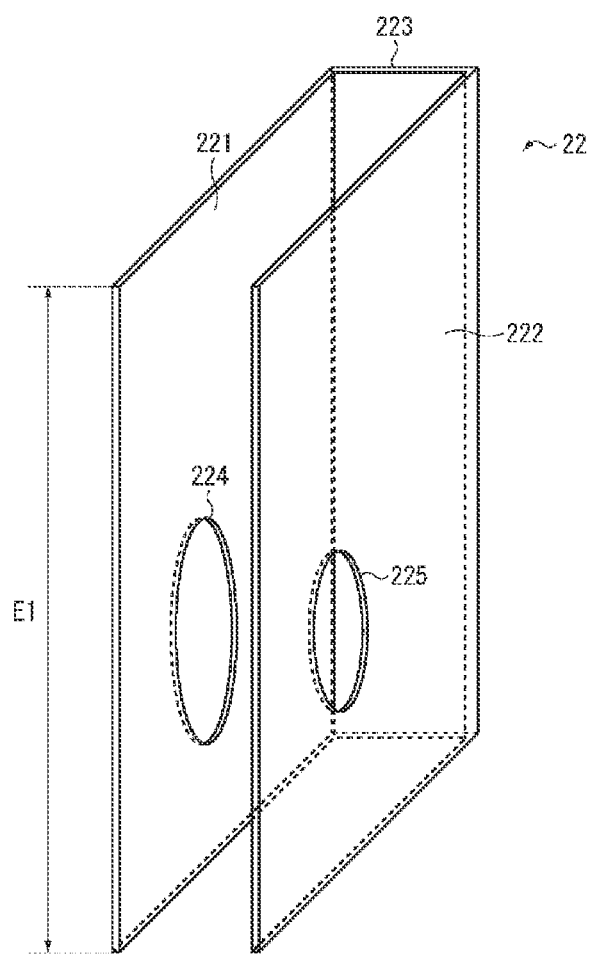
FIG. 4 is a perspective view illustrating a configuration of a first rectifying plate.

Here, FIG. 4 is a perspective view illustrating a configuration of the first rectifying plate 22. The first rectifying plate 22 has, for example, a substantially U-shaped cross section in an LW plane (a plane formed by the optical axis of the laser beam L and the welding direction W).

Specifically, as illustrated in FIGS. 2 to 4, the first rectifying plate 22 includes a first flat surface member 221 arranged on the laser nozzle 21 side, a second flat surface member 222 arranged on the welded portion P side to face the first flat surface member 221, and a connecting member 223 that connects a side surface of the first flat surface member 221 on one side in the longitudinal direction and a side surface of the second flat surface member 222 on one side in the longitudinal direction. Note that the first rectifying plate 22 may be formed by welding the first flat surface member 221, the second flat surface member 222, and the connecting member 223. Otherwise, the first rectifying plate 22 may be formed by bending a single metal plate.

As illustrated in FIG. 4, the first flat surface member 221 has a first laser opening 224 that allows the laser beam L to pass therethrough. In addition, the second flat surface member 222 has a second laser opening 225 that allows the laser beam L to pass therethrough. The first laser opening 224 and the second laser opening 225 are arranged coaxially. Also, a diameter of the second laser opening 225 may be formed smaller than a diameter of the first laser opening 224.

In addition, the first laser opening 224 may be formed at a position closer to a side that injects the compressed air (the lower side in FIG. 4) than the longitudinal midsection of the first flat surface member 221. With the configuration described above, an outlet of the compressed air can be kept away from the welded portion P, and it is possible to reduce an influence that the compressed air released from the first rectifying plate 22 to the outside makes on air in the vicinity of the welded portion P. Regarding the second laser opening 225 as well, similar to the first laser opening 224, the second laser opening 225 may be formed at a position closer to a side that injects the compressed air (the lower side in FIG. 4) than the longitudinal midsection of the second flat surface member 222.

The connecting member 223 is arranged, for example, so as to be perpendicular to the first flat surface member 221 and the second flat surface member 222, but the connecting member 223 is not limited to the configuration described above. For example, the connecting member 223 may be a plate material that is curved so as to be convex outward, or if a length of the horizontal width of the first flat surface member 221 does not correspond to a length of the horizontal width of the second flat surface member 222, the connecting member 223 may be arranged diagonally.

In addition, the first rectifying plate 22 may include a bracket 226 that connects the first rectifying plate 22 to a casing of the gate valve 27. Although not illustrated in the drawings, the bracket 226 has a laser opening that allows the laser beam L to pass therethrough. This laser opening is formed at a position corresponding to the first laser opening 224.

In addition, a tip nozzle 227 that may be arranged between the first rectifying plate 22 and the second rectifying plate 24 and form the optical path of the laser beam L may be arranged in the second laser opening 225. The tip nozzle 227 has, for example, a tubular shape with a narrowed tip side (a truncated cone tube shape or the like). By arranging the tip nozzle 227 described above in the second laser opening 225, it is possible to physically reduce the spatters, plumes, fumes, and the like that enter the optical path of the laser beam L.

In addition, the tip nozzle 227 is supported by, for example, a supporting component 228 arranged on an inner surface of the second flat surface member 222. Although not illustrated in the drawings, the supporting component 228 has a laser opening that allows the laser beam L to pass therethrough. This laser opening is formed at a position corresponding to the second laser opening 225. Note that it is possible to omit the supporting component 228 and connect the tip nozzle 227 to a surface of the second flat surface member 222 directly.

The first air knife 23 includes, for example, as illustrated in FIGS. 2 and 3, an air nozzle 231 that injects the compressed air along the longitudinal direction of the first flat surface member 221 constituting the first rectifying plate 22, and a guiding component 232 that guides the compressed air.

The guiding component 232 includes, for example, wall components arranged on both sides in an injection direction of the compressed air and an opening that allows the laser beam L to pass therethrough. The wall components are arranged at positions where the wall components do not interfere with the first laser opening 224. By arranging the guiding component 232 described above, it is possible to keep the compressed air from diffusing and flow the compressed air efficiently in the longitudinal direction of the first rectifying plate 22. In addition, the guiding component 232 may be connected to the supporting component 228 and supported by the supporting component 228. Note that the guiding component 232 may be supported by the first flat surface member 221 or the second flat surface member 222 instead of being supported by the supporting component 228.

The air nozzle 231 is connected to the guiding component 232. For example, as illustrated in FIG. 2, the air nozzle 231 is configured to inject the compressed air from the lower end side of the first rectifying plate 22 to the upper end side of the first rectifying plate 22. In addition, the air nozzle 231 is arranged at a position close to an inner surface of the first flat surface member 221 constituting the first rectifying plate 22. As described above, by injecting the compressed air in parallel to the first flat surface member 221, from the position close to the first flat surface member 221, the compressed air flows along the inner surface of the first flat surface member 221 in close proximity to the inner surface of the first flat surface member 221 by the Coanda effect. Therefore, a rectified compressed air layer can be formed on the optical path of the laser beam L, and the first laser opening 224 can be shielded by the compressed air.

Figure 5:
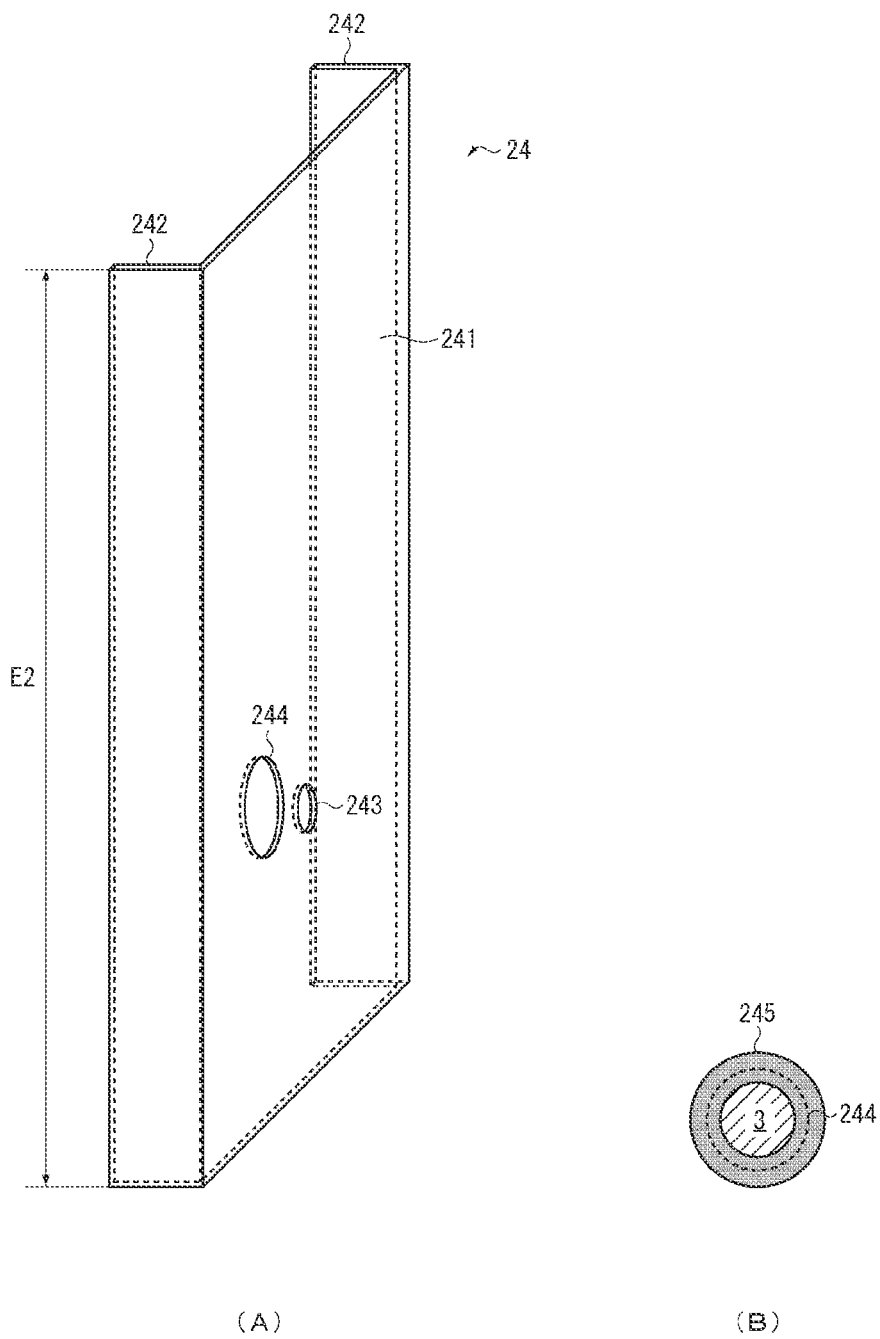
FIG. 5(A) is a perspective view illustrating a configuration of a second rectifying plate.
FIG. 5(B) is a front view illustrating a torch opening of the second rectifying plate in a state where a welding torch is installed.

Here, FIG. 5 is a diagram illustrating a configuration of the second rectifying plate 24. FIG. 5(A) is a perspective view, and FIG. 5(B) is a front view illustrating a torch opening in a state where the welding torch 3 is installed. The second rectifying plate 24 has, for example, a substantially C-shaped cross section in the LW plane.

Specifically, as illustrated in FIGS. 2, 3, and 5(A), the second rectifying plate 24 includes a front surface member 241 arranged above the welded portion P and a pair of side surface members 242 arranged along side surfaces on both sides of the front surface member 241 in the longitudinal direction. Note that the second rectifying plate 24 may be formed by welding the front surface member 241 and the side surface members 242. Otherwise, the second rectifying plate 24 may be formed by bending a single metal plate.

The side surface members 242 are arranged, for example, so as to be perpendicular to the front surface member 241, but the side surface members 242 are not limited to the configuration described above. For example, the side surface members 242 may be arranged so as to form an acute angle or an obtuse angle with the front surface member 241. Otherwise, the side surface members 242 may be arranged so as to be curved.

As illustrated in FIG. 5(A), the front surface member 241 has a laser opening 243 that allows the laser beam L to pass therethrough. In addition, the laser opening 243 is arranged coaxially with the first laser opening 224 and the second laser opening 225 of the first rectifying plate 22. Also, a diameter of the laser opening 243 may be formed smaller than a diameter of the second laser opening 225.

Furthermore, the laser opening 243 may be formed at a position closer to a side that injects the compressed air (the lower side in FIG. 5(A)) than the longitudinal midsection of the front surface member 241. With the configuration described above, an outlet of the compressed air can be kept away from the welded portion P, and it is possible to reduce an influence that the compressed air released from the second rectifying plate 24 to the outside makes on the air in the vicinity of the welded portion P.

In addition, assuming that a length of the second rectifying plate 24 in the longitudinal direction is E2 and a length of the first rectifying plate 22 in the longitudinal direction is E1, the length of the first rectifying plate 22 and the length of the second rectifying plate 24 may be set so that a relationship that E2 is longer than E1 holds true. As described above, by forming the second rectifying plate 24 longer than the first rectifying plate 22, the outlet of the compressed air released from the second rectifying plate 24 to the outside can be kept away from the welded portion P.

In addition, as illustrated in FIG. 5(A), the front surface member 241 has the torch opening 244 through which the tip of the welding torch 3 can be inserted. The torch opening 244 is formed at a position close to the laser opening 243.

In addition, as illustrated in FIG. 5(B), a gap formed when the welding torch 3 is inserted through the torch opening 244 may be filled with an insulating material 245. In FIG. 5(B), for convenience of description, the insulating material 245 is illustrated filled in gray. As described above, by filling the gap between the torch opening 244 and the welding torch 3, it is possible to block air flowing in and out of this gap. In addition, by using the insulating material 245 as a burying material, it is possible to interrupt the current flowing from the welding torch 3 to the second rectifying plate 24 and suppress the occurrence of short circuit.

In addition, as illustrated in FIGS. 2 and 3, the second rectifying plate 24 may include a bracket 246 that is connected to the first rectifying plate 22. The bracket 246 is, for example, connected to the supporting component 228. The bracket 246 may be formed integrally with the supporting component 228. In addition, the bracket 246 may be connected to the second flat surface member 222 of the first rectifying plate 22 instead of being connected to the supporting component 228.

The second air knife 25 includes, for example, as illustrated in FIGS. 2 and 3, an air nozzle 251 that injects the compressed air along the longitudinal direction of the front surface member 241 constituting the second rectifying plate 24. The air nozzle 251 is connected to the bracket 246. For example, as illustrated in FIG. 2, the air nozzle 251 is configured to inject the compressed air from the lower end side of the second rectifying plate 24 to the upper end side of the second rectifying plate 24.

In addition, the air nozzle 251 is arranged at a position close to an inner surface of the front surface member 241 constituting the second rectifying plate 24. As described above, by injecting the compressed air in parallel to the front surface member 241 from the position close to the front surface member 241, the compressed air flows along the inner surface of the front surface member 241 in close proximity to the inner surface of the front surface member 241 by the Coanda effect. Therefore, a rectified compressed air layer can be formed on the optical path of the laser beam L, and the laser opening 243 can be shielded by the compressed air.

In addition, a flow rate of the compressed air injected from the first air knife 23 may be set to be larger than a flow rate of the compressed air injected from the second air knife 25. The spatters, plumes, fumes, and the like are more prone to be cooled and solidified into metal particles with distance from the welded portion P. Therefore, since a by-product reaching the first air knife 23 arranged at a position distant from the welded portion P has kinetic energy higher than a by-product near the second air knife 25 arranged at a position close to the welded portion P, stronger shielding capability is required to shield the by-product reaching the first air knife 23.

By the way, in the hybrid welding using both the laser welding and the arc welding, the welding torch is arranged at a position close to an emission end portion of the laser beam L. Therefore, in case of trying to arrange a rectifying plate so as not to interfere with the welding torch, there is no other choice but to make a lateral width (a length in the lateral direction) of the rectifying plate narrower. In this case, since the rectifying plate is arranged at a position close to the welded portion, an airflow that goes around the rectifying plate is formed, and the spatters, plumes, fumes, and the like easily enter the emission end portion of the laser beam L.

In addition, when the compressed air from the air knife interferes with the welding torch, a turbulent flow is formed, and the turbulent flow disturbs the air in the vicinity of the welded portion. The turbulence of the air causes a large fluctuation in states of the plasma and plumes in the welded portion, and the turbulence of the air causes an unstable state of a molten pool.

Therefore, in the hybrid welding device 1 according to the present embodiment, the second rectifying plate 24 covers not only the optical path of the laser beam L but also an outer periphery of the welding torch 3.

Consequently, it is possible to form a long lateral width of the second rectifying plate 24 and reduce a flow of air going around the second rectifying plate 24. In addition, since only the tip of the welding torch 3 penetrates through the second rectifying plate 24, even when the compressed air interferes with the welding torch 3 to cause the turbulent flow, the influence that the turbulent flow makes on the air in the vicinity of the welded portion P can be reduced.

According to the hybrid welding device 1 described in the present embodiment above, by arranging the first rectifying plate 22 and the second rectifying plate 24, the by-products such as the spatters, plumes, and fumes that enter the laser optical system are eliminated. Therefore, it is possible to reduce the influence of the by-products such as the spatters, plasma, plumes, and fumes, which are generated during welding, and reduce the contamination of the laser optical system and the welding defects.

The present invention is not limited to the embodiments described above, and it goes without saying that various modifications can be made without departing from the spirit and scope of the present invention.

The invention claimed is:

1. A hybrid welding device that performs welding by combining use of laser welding and arc welding, the hybrid welding device comprising:
    a laser head that emits a laser beam to a welded portion; and
    a welding torch that supplies a filler material to the welded portion, wherein
    the laser head includes: a laser nozzle that forms an optical path of the laser beam; a first rectifying plate arranged at a tip side of the laser nozzle so as not to interfere with the laser beam; a first air knife that injects first compressed air along the first rectifying plate; a second rectifying plate arranged between the first rectifying plate and the welded portion so as not to interfere with the laser beam; and a second air knife that injects second compressed air along the second rectifying plate,
    the first rectifying plate and the second rectifying plate have a shape elongated in a direction perpendicular to an optical axis of the laser beam and a welding direction, and
    the second rectifying plate has a torch opening through which a tip of the welding torch can be inserted.

2. The hybrid welding device according to claim 1, wherein the first air knife is arranged to inject the first compressed air in a longitudinal direction of the first rectifying plate, and the second air knife is arranged to inject the second compressed air in a longitudinal direction of the second rectifying plate.

3. The hybrid welding device according to claim 1, wherein
    the first rectifying plate comprises: a first flat surface member arranged on the laser nozzle side; a second flat surface member arranged on the welded portion side to face the first flat surface member; and a connecting member that connects a side surface of the first flat surface member on one side in a longitudinal direction and a side surface of the second flat surface member on one side in a longitudinal direction, and
    the first flat surface member and the second flat surface member have a laser opening through which the laser beam passes.

4. The hybrid welding device according to claim 1, wherein
    the second rectifying plate comprises: a front surface member arranged above the welded portion; and a pair of side surface members arranged along side surfaces on both sides in a longitudinal direction of the front surface member, and
    the front surface member has: a laser opening through which the laser beam passes; and the torch opening.

5. The hybrid welding device according to claim 1, wherein the hybrid welding device comprises a bracket that connects the first rectifying plate with the second rectifying plate.

6. The hybrid welding device according to claim 1, wherein the hybrid welding device comprises a tip nozzle that is arranged between the first rectifying plate and the second rectifying plate and forms the optical path of the laser beam.

7. The hybrid welding device according to claim 1, wherein the hybrid welding device comprises an insulating material that fills a gap between the torch opening and the welding torch.

8. The hybrid welding device according to claim 1, wherein the hybrid welding device comprises a gate valve arranged in the laser nozzle.

9. The hybrid welding device according to claim 1, wherein the second rectifying plate is formed to be longer than the first rectifying plate.

10. The hybrid welding device according to claim 1, wherein a flow rate of the first compressed air injected from the first air knife is set to be larger than a flow rate of the second compressed air injected from the second air knife.

* * * * *